United States Patent [19]

Bator

[11] 4,056,871
[45] Nov. 8, 1977

[54] CUTTING INSERT

[75] Inventor: James S. Bator, Latrobe, Pa.

[73] Assignee: Kennametal Inc., Latrobe, Pa.

[21] Appl. No.: 734,452

[22] Filed: Oct. 21, 1976

[51] Int. Cl.$^2$ ............................................. B26D 1/00
[52] U.S. Cl. ................................................. 407/114
[58] Field of Search ................... 29/95 R, 95 A, 95 B, 29/95 C, 96, 105 R, 105 A

[56] References Cited

U.S. PATENT DOCUMENTS

| 1,756,516 | 4/1930 | Klopstock | 29/95 R |
| 3,395,434 | 8/1968 | Wirfelt | 29/95 R |
| 3,504,413 | 4/1970 | Siewert et al. | 29/95 R X |
| 3,973,307 | 8/1976 | McCreery | 29/95 R |

Primary Examiner—Harrison L. Hinson
Attorney, Agent, or Firm—Lawrence R. Burns

[57] ABSTRACT

A positive rake cutting insert with an integrally molded chipbreaker configuration is provided which comprises a cutting edge, a land area, first and second planar walls and a central face area. The top face configuration of the positive rake insert has a land area extending inwardly from the cutting edge and joining a fillet radius. The fillet radius extends inwardly and downwardly and joins a first planar wall which is also inclined downwardly toward the center of the insert. A second planar wall is inclined upwardly from the first planar wall toward the center of the insert and joins a central face area of the insert.

17 Claims, 9 Drawing Figures

CUTTING INSERT

BACKGROUND OF THE INVENTION

Cutting inserts made of hard wear resistant material, such as a cemented hard metal carbide, perform very adequately when removing metal from a workpiece. Because of the feeds and speeds utilized in removing metal from a workpiece when using a cemented hard metal carbide insert, safety, efficiency and workpiece finish require that the metal removed from the workpiece be broken into discrete individual chips that may be conveniently collected and removed from the work area.

Chipbreakers take many forms and, in some cases, may be a separate structure that is used in conjunction with a cutting insert or the chipbreaker may take the form of a groove integrally molded in the cutting insert.

The metal being removed from the workpiece by the cutting insert is sheared from the parent metal in a region near the cutting edge of the insert being used. As the metal slides over the cutting insert and to the rear of the cutting edge, a chipbreaking obstruction, such as the integrally molded groove mentioned above, impedes the free flow of the sheared metal and deflects or bends the sheared metal in order to break it into discrete individual chips of a manageable size.

When such a chipbreaker plate or groove impedes or bends the sheared metal so as to break it into chips, additional work is done to the chip other than the work required to shear the metal from the parent workpiece. This additional work requires greater power consumption, thereby generating greater temperatures on the cutting edge and face of the insert.

Chipbreakers of the prior art, when used with a positive rake insert, have usually put too much work into the act of bending the sheared metal by presenting unnecessarily severe obstructions in the path of the metal being removed from the workpiece. When this is done, greater conditions of temperature and force are put on the cutting edge of the insert, ultimately leading to premature failure of the cutting edge of the insert.

It has been found, with the geometry of the present invention, that the obstruction to the path of the metal being removed from the workpiece can be minimized and still provide for efficient breakage of the chips over a wide range of feeds and speeds.

BRIEF SUMMARY OF THE INVENTION

According to the present invention, a cutting insert is formed of a hard wear resistant material and comprises a polygonal body having top and bottom faces and a peripheral wall joining the top and bottom faces.

The cutting insert geometry described by the present invention is used with a positive rake insert such that at least one of the faces of the inert forms an acute included angle with the peripheral wall of the body of the insert. At least one of the top and bottom faces of the insert has a cutting edge formed by the juncture of the peripheral wall with a land area extending inwardly toward the center of the polygonal body from the cutting edge.

The land area is preferably from 0.005 to 0.060 inches in width. A fillet radius extends downwardly from the innermost edge of the land area and joins with a first planar wall which inclines downwardly toward the center of the insert. The fillet radius used in the configuration of the present invention is preferably from 0.002 to 0.004 inches and blends the land area with the first planar wall.

The first planar wall is preferably inclined downwardly at an angle of from 5° to 15° from a plane parallel to the plane of the cutting edges on the insert. Inclined upwardly from the bottom of the first planar wall is a second planar wall extending toward the center of the insert and joining a flat central face area with the center of the body of the insert.

A cutting insert according to the above-mentioned configuration, when placed in a positive rake tool holder, provides positive rake cutting conditions on a workpiece and also provides minimal obstruction to the flow of the metal being removed while also controlling chips.

The exact nature of the present invention will become more clearly apparent upon reference to the following detailed specification taken in connection with the accompanying drawings in which.

DETAILED DESCRIPTION OF THE INVENTION

Figure 1:
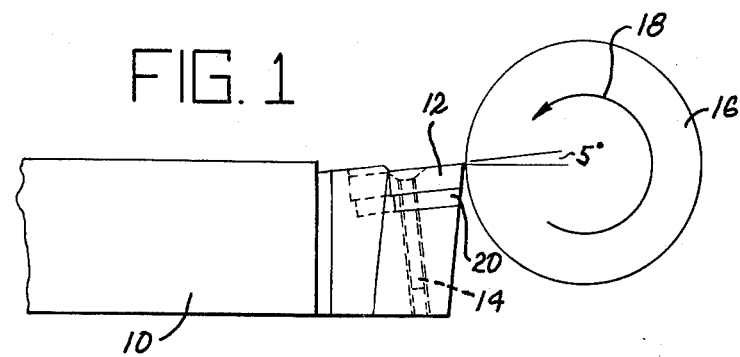
FIG. 1 is a side view of a positive rake tool holder and insert being presented to a workpiece.

Referring to the drawings somewhat more in detail, FIG. 1 shows a positive rake tool holder 10 having on its forward end a positive rake insert 12 clamped in position by clamp member 14 while workpiece 16 is being rotated in a direction of arrow 18 against the cutting insert 12.

Clamp means 14 may take any form of the known clamp members used with tool holders, as long as the clamp member does not unduly interfere with the free flow of sheared metal material flowing over the face of the cutting insert. In this particular case, clamp member 14 is shown as a pin member extending through a hole in the center of insert 12 and having its lower end releasably secured near the bottom of tool holder 10. With cutting insert 12 in tool holder 10, the insert 12 is presented to the workpiece 16 at approximately 5° positive rake.

The insert 12 is shown being supported by an insert shim 20 which is typical of most tool holders used in the industry. Tool holder 10, shown in FIG. 1, is adapted so as to present the insert 12 in a 5° positive back rake condition to the workpiece. However, this invention is not limited to the degree of positive back rake that a tool holder or insert may have when presented to the workpiece 16.

Figure 2:
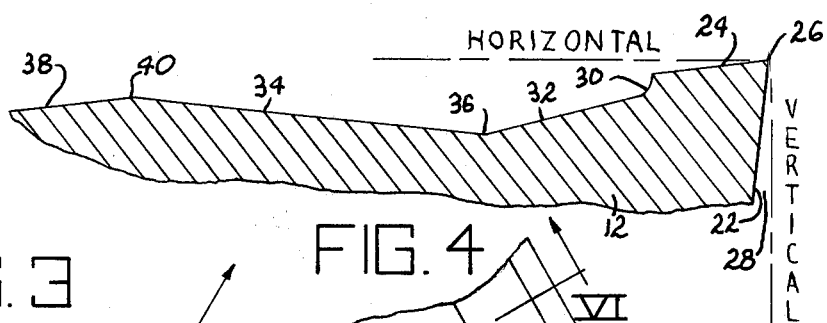
FIG. 2 is a cut-away view of the top face of the insert according to the present invention.

Shown in FIG. 2 is a cut-away view of the top face of the insert 12 showing its peripheral wall 22 and land area 24 in the top face of insert 12. Cutting edge 26 is formed at the juncture of peripheral wall 22 and land area 24. Because peripheral wall 22 forms an acute angle with land area 24, an end clearance 28 is provided between the insert 12 and workpiece 16.

Inwardly of land area 24, a fillet radius 30 is provided which joins land area 24 to an inclined first planar wall 32. The first planar wall 32 slopes inwardly and downwardly from the lowermost point of fillet radius 30 until it joins a second planar wall 34 at a juncture point 36 on insert 12. The second planar wall 34 is shown inclining inwardly and upwardly toward the center of insert 12 until it joins a central face area 38 at juncture 40 between the second planar wall 34 and central face area 38.

It is to be understood that, in FIG. 2, the insert is shown in its preferred environment, setting in a tool holder having a support seat 42 which is adapted so as to present insert 12 to workpiece 16 in a positive back rake mode of metalcutting.

Figure 3:
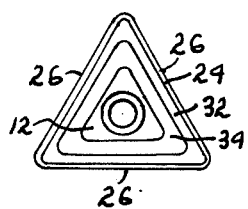
FIG. 3 is a plan view of the insert according to the present invention.

With reference to FIG. 3, what is shown therein is a plan view of the top face of the insert according to the present invention. The insert is a polygonal insert, in this case a triangular insert. It is to be understood that, when the geometry as disclosed in the present invention is polygonal in nature, the insert may have multiple cutting edges 26 thereon. Shown in FIG. 3 is the insert 12 having cutting edges 26 on each of its sides and also having land areas 24, fillet radius 30, first planar wall 32 and second planar wall 34 being located inwardly and toward the center of insert 12 from cutting edges 26. Preferably, when cutting edges 26 are formed on a polygonal body, the cutting edges will define a plane.

Figure 4:
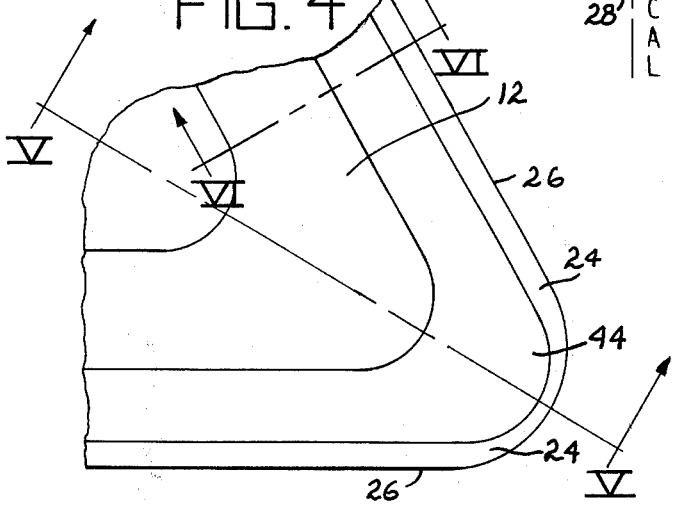
FIG. 4 is a cut-away plan view of a corner of the insert according to the present invention.

With reference to FIG. 4, what is shown therein is insert 12 having a cutting edge 26 on two sides of the polygonal body joined at a corner 44 of insert 12. Behind each of the cutting edges 26 is a land area 24 which is of uniform width around most of the peripheral surface of the polygonal insert 12 with the exception that the land area 24 narrows in wdith as it extends around corners 44 of the polygonal insert 12.

Figure 5:
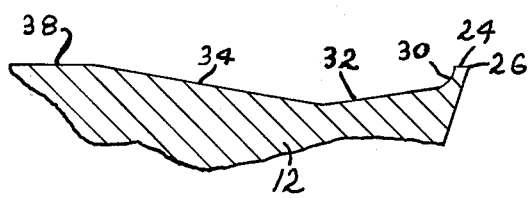
FIG. 5 is a sectional view through V—V of FIG. 4.

With reference to FIG. 5, what is shown therein is a sectional view through corner 44 of insert 12. Shown therein is a cutting edge 26 in the land area 24. Inwardly of land area 24 is a fillet 30, first planar wall 32, second planar wall 34 and the central face area 38. Land area 24 is shown having its width narrowest at corner portion 44.

With reference to FIG. 5, the preferable embodiment of the present invention is that the land area 24, when extending along one of the edges of polygonal insert 12, have a width of from 0.005 to 0.060 inches, but with that width narrowing as it extends around one of the corners of insert 12. The land area will extend inwardly and be substantially parallel with the plane of the cutting edges 26. The fillet radius 30 showing the first planar wall 22, land area 24 is preferably from 0.002 to 0.004 inches. The first planar wall is preferably inclined downwardly from the plane of the cutting edges from 5° to 15° and extends inwardly toward the center of cutting insert 12.

The second planar wall 34 is inclined upwardly relative to the plane of the cutting edges from 5° to 30° and joins central face area 38 of insert 12. The plane of the central face of the insert is preferably parallel to the plane of the cutting edges, and when it is substantially parallel, it is preferable that the perpendicular distance from the plane of the central face to the plane of the cutting edges is from 0.000 to 0.010 inches.

Figure 6:
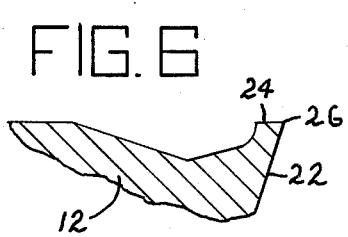
FIG. 6 is a sectional view through section VI—VI of FIG. 4.

With reference to FIG. 6, what is shown therein is a sectional view through line VI—VI of FIG. 4 showing an edge of cutting insert 12 having cutting edge 26 formed by the peripheral wall 22, land area 24. It is to be noted that land area 24 is shown being wider in this sectional view than land area 24 in FIG. 5. This is preferable because, as mentioned before, FIG. 6 shows land area 24 in its preferable uniform width along the length of one side of cutting insert 12 rather than corner 44 of cutting insert 12.

Figure 7:
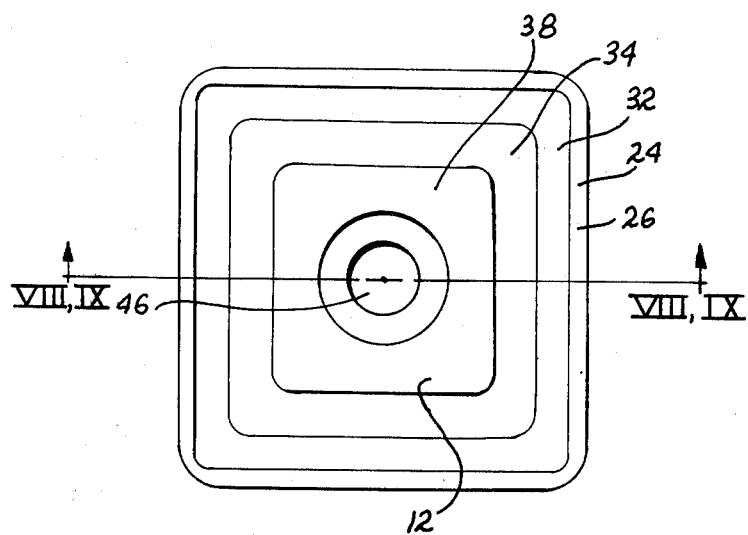
FIG. 7 is a plan view of a square insert according to the present invention.

Shown in FIG. 7 is a plan view of a square insert according to the present invention, the square configuration being another form of polygonal insert 12 which may be formed according to the geometry of the present invention. The cutting insert 12, as shown in FIG. 7, has cutting edges 26, land area 24, first planar wall 32, second planar wall 34 and a central face area 38 shown therein. Hole 46 shown in the center of polygonal insert 12 is formed therein for mounting insert 12 on tool holder 10 as shown in FIG. 1.

Figure 8:
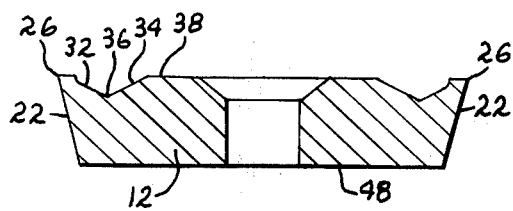
FIGS. 8 and 9 are sectional views through the center of the insert of FIG. 7 showing optional configurations.
Figure 9:
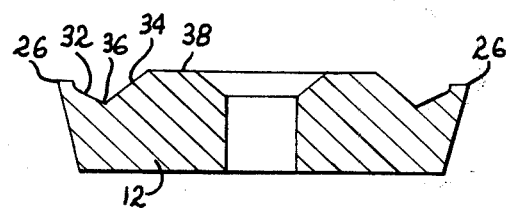

FIGS. 8 and 9 are sectional views through the center of the insert of FIG. 7 showing optional preferable geometrical limitations of the polygonal inserts 12 according to the present invention.

FIG. 8 shows the insert 12 having a peripheral wall 22 and cutting edges 26 on different sides of insert 12. The bottom face 48 of insert 12 is preferably flat for mounting purposes so as to provide for firm seating in tool holder 10. As was mentioned above, insert 12 has a central face area 38 which is preferably planar as is shown in FIG. 8.

The planar central surface area 38 coincides with the plane defined by cutting edges 26. Insert 12 has a first planar wall 32 and a second planar wall 34 is joined at juncture point 36. In a preferable embodiment of the invention according to the present application, the perpendicular distance from the planar surface area 38 to the juncture point 36 is from 0.005 to 0.010 inches when the central planar surface area 38 coincides with the plane defining cutting edges 26 of insert 12.

As shown in FIG. 9, the planar central surface area 38 may be in a plane substantially parallel to and above the plane defined by cutting edges 26. Juncture point 36, between the inclining planar walls 32 and 34, are in a preferred embodiment of the invention having perpendicular distance from the planar central surface area 38 of from 0.005 to 0.020 inches.

The planar central surface area 38 in a preferreed embodiment of the present invention is usually located even with the plane defined by cutting surfaces 26 or up to 0.010 inches above the plane defined by cutting edges 26.

Modifications may be made within the scope of the appended claims.

What is claimed is:

1. A molded indexable cutting insert formed of a hard wear resistant material and comprising a polygonal body having top and bottom faces wherein at least one of said faces comprises: at least two cutting edges defining a plane and formed by the juncture of said peripheral wall with said one of said faces; a land area extending inwardly toward the center of said polygonal body from said cutting edge; a fillet radius extending downwardly from the innermost edge of said land area; a first substantially planar wall portion extending from the bottom of said fillet and inclined downwardly from the plane of said cutting edges toward the center of said polygonal body in the range of from 5° to 15°; a second substantially planar wall portion extending from the inner edge of said first planar wall toward the center of said body and inclined upwardly toward the plane of said cutting edges in the range of from 5° to 30°, said second planar wall terminating in a central face area formed on the center portion of said polygonal body.

2. A cutting insert according to claim 1 in which said cutting edges are angularly related one to another and extend around said juncture.

3. A cutting insert according to claim 2 in which said peripheral wall forms an acute angle of less than 90° with the plane defined by said cutting edges.

4. A cutting insert according to claim 2 in which said central face is substantially parallel with the plane defined by said cutting edges.

5. A cutting insert according to claim 4 in which the perpendicular distance from the plane of said central face to the plane of said cutting edges is from 0.000 to 0.010 inches.

6. A cutting insert according to claim 5 in which the perpendicular distance from the plane of said central face to the lowermost point of the juncture joining said first and second substantially planar portions is from 0.005 to 0.020 inches.

7. A cutting insert according to claim 6 in which said land area is from 0.005 to 0.060 inches in width.

8. A cutting insert according to claim 7 in which said insert is formed of a cemented hard metal carbide material.

9. A cutting insert according to claim 8 in which said cemented hard metal carbide material comprises tungsten carbide.

10. A cutting insert according to claim 9 in which said fillet radius is approximately from 0.002 to 0.004 R inches.

11. A cutting insert according to claim 7 in which said land area width narrows as said land area extends around the corners of said polygonal body.

12. A cutting tool comprising a polygonal body having top and bottom faces and a peripheral wall joining said top and bottom faces, at least one of said faces comprising: cutting edges defining a plane and formed by the juncture of said peripheral wall with said one of said faces; said peripheral wall joining said top face at an acute angle less than 90° with the plane of said cutting edges; a land area extending inwardly toward the center of said polygonal body from said cutting edges; a fillet radius extending downwardly from the innermost edge of said land area; a first substantially planar wall portion extending from the bottom of said fillet and inclined downwardly from the plane of said cutting edges toward the center of said polygonal body in the range of from 5° to 15°; and a second substantially planar wall portion extending toward the center of said body from the inner edge of said first planar wall and inclined upwardly toward the plane of said cutting edges in the range of from 5° to 30°, said second planar wall terminating in a face area formed on a portion of said polygonal body.

13. A cutting tool according to claim 12 in which said face area is substantially parallel with the plane defined by said cutting edges.

14. A cutting tool according to claim 13 in which the perpendicular distance from the plane of said face area and the plane of said cutting edges is from 0.000 to 0.010 inches.

15. A cutting tool according to claim 14 in which the perpendicular distance from the plane of said face area to the lowermost point of the juncture between said first and second substantially planar portions is from 0.005 to 0.020 inches.

16. A cutting tool according to claim 15 in which said land area is from 0.005 to 0.060 inches in width.

17. A cutting tool according to claim 12 in which said fillet radius is approximately 0.002 R to 0.004 R inches.

* * * * *